Jan. 6, 1970  R. A. BAUMGARTNER ET AL  3,487,508

HOPPER-LEVELLER MOLD FILLING DEVICE

Filed Sept. 19, 1967  2 Sheets-Sheet 1

INVENTORS
RICHARD A. BAUMGARTNER
LOUIS L. COFRAN
BY

INVENTORS
RICHARD A. BAUMGARTNER
LOUIS L. COFRAN
BY
K.W. Brownell

United States Patent Office 3,487,508
Patented Jan. 6, 1970

3,487,508
HOPPER-LEVELLER MOLD FILLING DEVICE
Richard A. Baumgartner, Niagara Falls, and Louis L. R. Cofran, Eggertsville, N.Y., assignors to The Carborundum Company, Niagara Falls, N.Y., a corporation of Delaware
Filed Sept. 19, 1967, Ser. No. 668,856
Int. Cl. B29f 1/06
U.S. Cl. 18—30                                8 Claims

ABSTRACT OF THE DISCLOSURE

A hopper-leveller mold filling device having a support element carried by the upper edge of a barrel mold and a hopper-leveller assembly carried by the support element. The support element consists of three arms joined together at one end and extending outwardly from the joint at an angle of 120° from each other and having rollers on the other end of each arm which ride on the upper edge of the mold barrel. The hopper-leveller assembly consists of a hopper and a blade mounted on the hopper adjacent the discharge end. The hopper-leveller assembly is adjustably mounted on the support element so that the height of the blade from the mold bottom can be adjusted. A ring is carried by an extension from each arm of the support element which, when in contact with a driving wheel, causes the device to rotate coaxially with the axis of the mold.

---

This invention relates to a molding apparatus and, more particularly, to a new and improved hopper-leveller mold filling apparatus for spreading material uniformly throughout a mold.

In the art of molding thin shaped articles, such as abrasive cut-off wheels by way of example, it has been the general practice to charge a mold assembly with the preferred mix of a predetermined weight and to spread the mix throughout the mold into a layer of uniform thickness. Conventionally, this is effected by introducing an elongated blade into the mold barrel at a fixed vertical distance from the bottom compression surface of the mold and rotating said mold by means of a turntable until a layer of uniform thickness of mix is obtained. Thereafter, the layer of mix is compacted under heavy pressure in a press and subsequently introduced into an oven or furnace where it is subjected to heat treatment at elevated temperatures. Mold assemblies commonly comprise a bottom compression surface and a removable ring or barrel which, when in position on said bottom, forms a mold cavity defined by the bottom compression surface and inner surface of said barrel. During pressing a piston is introduced into the cavity for exerting compressive force.

Although such prior known mold levelling devices have served the purpose for which they were designed, they have not been entirely satisfactory under all conditions of operation due to the costly turntables required and the problems encountered in maintaining said turntables in operation. These problems become more serious as the size of the mold increases. One of the critical problems confronted in the utilization of the above apparatus in the molding of large diameter articles is that the end of the cantilevered levelling blade tends to sag downwardly, thereby displacing more material away from the periphery of the mold toward the center thereof, resulting in a finished product of variable density. Moreover, the turntable is often inaccurately aligned in a horizontal plane to further enhance undesirable variations in the density of the finished product.

The apparatus of the present invention, as hereinafter described, provides a solution to the above problems by employing a hopper-leveller mold filling apparatus for filling a mold with a uniform layer of mix and eliminating the necessity of a bulky, costly, highly accurate turntable and the maintenance problems related thereto.

Accordingly, it is an object of the present invention to provide a new and improved hopper-leveller mold filling apparatus.

It is another object of the present invention to provide a new and improved hopper-leveller mold filling apparatus which is compact, simple and strong in construction, efficient in its operation, and rugged and durable in use.

It is a further object of the present invention to provide a new and improved hopper-leveller mold filling apparatus which is rotatable on a stationary mold barrel.

It is still another object of the present invention to provide a new and improved hopper-leveller mold filling apparatus for accurately filling a mold with a layer of material of uniform thickness.

These and other objects of this invention will become more apparent upon consideration of the following detailed description thereof when taken in conjunction with the following drawings, in which.

Figure 1:
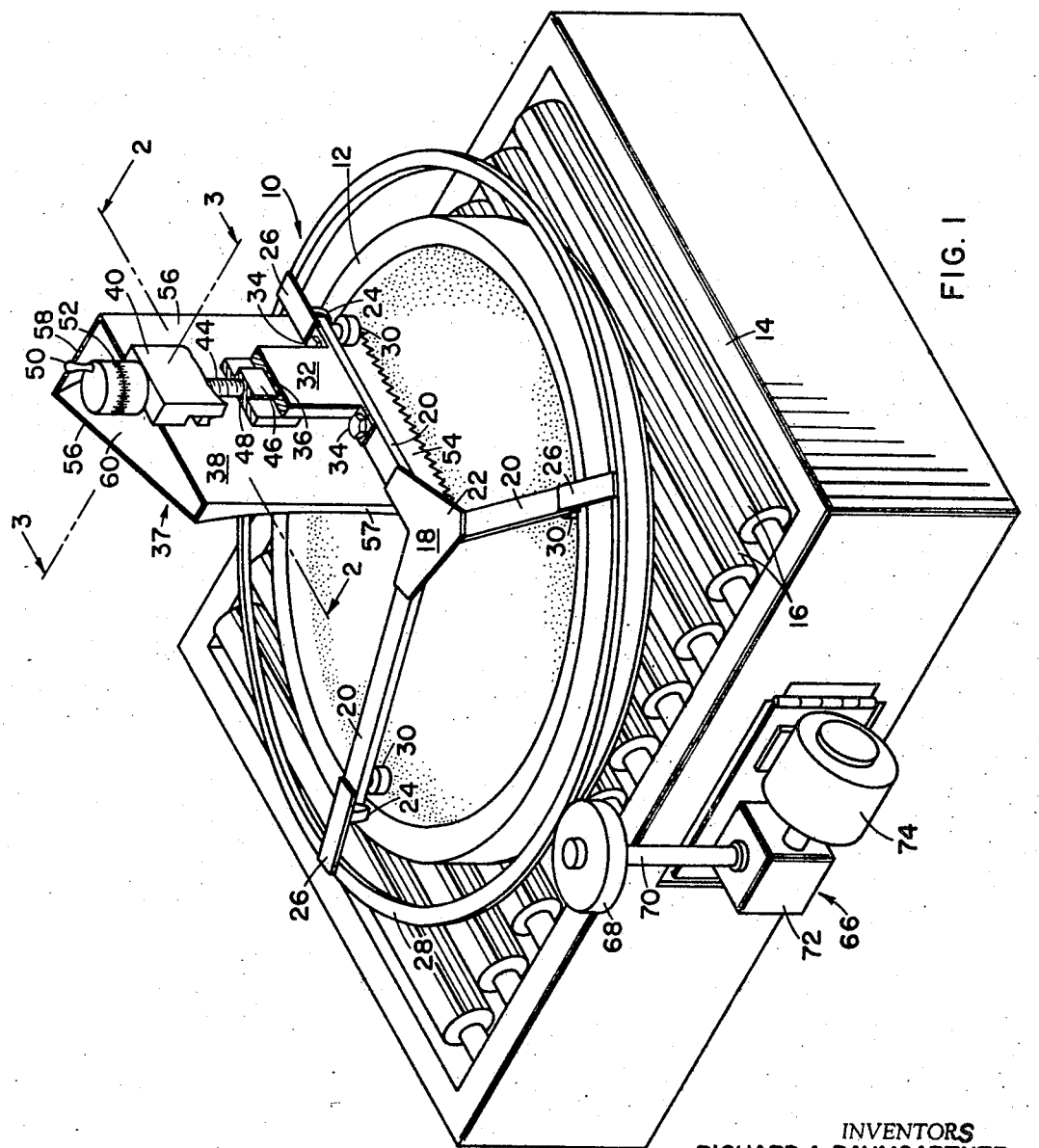
FIG. 1 is an isometric view of the hopper-leveller mold filling apparatus constructed in accordance with the principles of this invention shown supported on a mold barrel.

With reference to FIG. 1 of the drawings, it will be seen that a hopper-leveller mold filling apparatus generally designated 10, is adapted to be supported on a cylindrical mold barrel 12 which in turn is supported on a conveyor 14 having a plurality of elongated rollers 16. After the mold barrel 12 is filled to the proper level, the hopper-leveller mold filling apparatus 10 is removed and the mold is conveyed into a press (not shown) which is disposed adjacent to conveyor 14 for compacting the mix.

Hopper-leveller mold filling device, shown generally as 10, comprises support element 18 which is made up of arms 20 joined to each other at their inner ends and extending outwardly therefrom at angles from each other of approximately 120°. Plate 22 is affixed over the joint to reinforce the same and to insure rigidity of support element 18. The length of each arm is substantially equal to the inside radius of the mold barrel 12.

Journaled in the end of each arm is a roller 24 whose axis of rotation is perpendicular to the axis of support element 18. Rollers 24 carry the outer ends of arms 20 on the upper edge of mold barrel 12. Arm extensions 26 are butted on the outer end of each of the arms 20 and extend over rollers 24 and beyond the outside diameter of mold barrel 12. Ring 28 is affixed to and carried by the outer ends of arm extensions 26.

A roller 30 is journaled in the underside of each of said arms 20 adjacent to each outer end thereof and inwardly thereof so that its axis of rotation is parallel to the axis of support element 18 and so that each roller 30 is in contact with the inner surface of mold barrel 12 immediately adjacent the upper edge thereof. Rollers 30 prevent lateral displacement of hopper-leveller mold filling apparatus 10 during operation and insure accurate and uniform positioning of the apparatus each time it is used.

Hopper-leveller assembly 37 is attached to support element 18 by hopper support member 32 and hopper mounting member 40. Hopper support member 32 is attached to one of arms 20 by suitable means, such as by bolts 34. Hopper support member 32 is provided with a dovetail slot 36 on one face thereof and a passage 42 communicating with slot 36 and opening on the upper edge of member 32 for receiving threaded shaft 44. Hopper 38 is vertically movably attached to hopper support member 32 by means of mounting member 40 which is affixed on one face of said hopper 38 and threaded shaft 44. Hopper mounting member 40 has an extension 46 which is complementary to and slidably contained in slot 36. A threaded passage 48 runs vertically through member 32 and communicates with passage 42 of hopper support 32 for threadably receiving shaft 44.

Handle 50 is provided on the upper extremity of shaft 44 for turning the shaft and scale 52 is provided for measuring and recording the distance which hopper-leveller 37 is raised or lowered when shaft 44 is turned.

Figure 3:
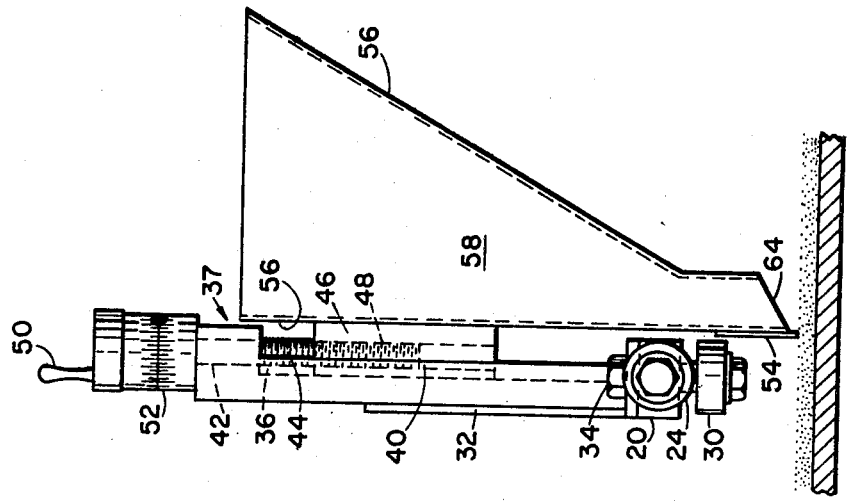
FIG. 3 is an enlarged sectional view taken on the vertical plane passing through line 3—3 of FIG. 1.
Figure 2:
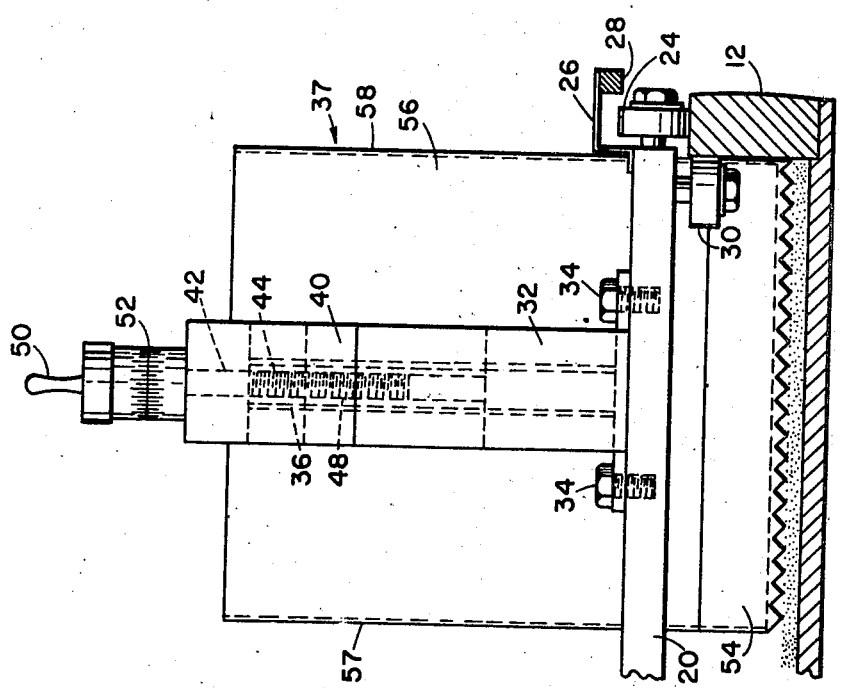
FIG. 2 is an enlarged sectional view taken on the vertical plane passing through line 2—2 of FIG. 1.

Referring to FIGS. 2 and 3, hopper 38 comprises rectangularly shaped side panels 56 and axial and peripheral panels of generally inverse right triangular configuration which define hopper area 60 (FIG. 1) for containing the mix to be spread in the mold. The peripheral panel is substantially wider than the axial panel so that the volume of hopper area 60 is larger at the periphery of the mold. This is the preferred hopper design because the volume of mix to be distributed around the periphery is greater than that required at the center. The side panel 56 to which hopper mounting member 40 is affixed is disposed substantially vertically while the other side panel is disposed vertically inwardly from the top or inlet of hopper 38. Adjacent the outlet end or bottom of hopper 38, both side panels 56 are disposed substantially vertically. Hopper outlet 64 is of substantially rectangular configuration.

Blade 54 is affixed to one side panel so that at least a portion of the blade extends below hopper outlet 64 for contacting and distributing the mix. In the figure the lower edge of blade 54 is saw-toothed as an aid in levelling the coarse particle sizes encountered in abrasive wheel mixes. However, the blade may be straight edged, particularly if the mold charge consists of fine particles of material.

In making certain types of abrasive wheels, such as for example cut-off wheels, it is desirable that the thickness of the wheel at the periphery be greater than at the wheel center. In such cases blade 54 is mounted on hopper 38 at a slight angle to the horizontal plane of the mold in order that blade 54 distribute the mix so that the mix layer gradually increases in thickness from the center of the mold radially outwardly towards the periphery.

Driving means shown generally as 66 comprises a driving wheel 68 mounted on shaft 70 which is mounted at 72 for being driven by motor 74. Wheel 68 is positioned so as to be in contact with ring 28 of the hopper-leveller mold filling apparatus 10. Driving wheel 68 is preferably made of rubber or similar material so as to provide adequate friction between wheel 68 and ring 28 to prevent slipping therebetween and to drive ring 28.

In operation apparatus 10 is positioned on mold barrel 12 so that rollers 24 ride upon the upper edge of the mold barrel. Apparatus 10 is properly centered by rollers 30 which are in contact with the upper inner face of mold barrel 12. The entire assembly is positioned so that ring 28 is in contact with driving wheel 68. The distance of blade 54 from the bottom of the mold is preset by raising or lowering hopper-leveller assembly by means of threaded shaft 44. The proper setting depends on the thickness of the layer of mix that is desired.

Sufficient mix to produce the abrasive article is weighed and charged into hopper 38. The mix is prevented from running out of hopper 38 when it is not moving by building up under hopper outlet 64, thereby preventing further material from running out.

Driving wheel 68, driven by shaft 70 and motor 74, rotates against ring 28, causing arms 20 to move along the upper edge of mold barrel 12 on rollers 24. Hopper-leveller assembly 37 is carried by one of arms 20 in a path around the interior of mold barrel 12. As it moves, hopper 38 discharges mix through hopper outlet 64 until the mix layer reaches the desired thickness, at which point it is in contact with blade 54 which evens the mix in a uniform layer.

If desired to produce thick abrasive articles requiring more mix than can be contained in hopper 38, an additional layer or layers can be distributed over the first layer by resetting the blade height and repeating the operation described above.

At the completion of the levelling operation, the hopper-leveller mold filling apparatus 10 is lifted away from mold barrel 12 and the mold is moved by means of conveyor 14, or other suitable means, to a press (not shown) for final pressing of the abrasive article.

In another embodiment of this invention, the upper edge of mold barrel 12 is provided with a groove therearound in which rollers 24 are contained when the hopper-leveller mold filling apparatus 10 is in position. In this manner accurate positioning is assured and lateral movement of the apparatus during use is prevented. In this embodiment rollers 30 are eliminated.

As a result of this invention, the necessity for using expensive turntables is thereby eliminated. Moreover, the necessity for accurately levelling a conveyor or other device for holding and carrying molds is eliminated. A uniform layer of mix with respect to the mold is attained, since the device of this invention rides around the mold rather than the mold turning with respect to a fixed blade as is now the practice.

A preferred embodiment of this invention having been described and illustrated, it is to be realized that modifications thereof may be made without departing from the broad sphere and scope of this invention as defined in the appended claims.

We claim:

1. A mold filling and levelling device for charging a cylindrical mold assembly with particulate material and for providing a uniform layer of such material therein which comprises a support element adapted for being carried by the upper edge of the barrel of said mold assembly and for rotation about the axis of said mold assembly, a hopper-leveller assembly comprising a hopper having an axial edge, a peripheral edge, an inlet end and a discharge end and a blade affixed to said hopper adjacent said discharge end and extending therebeyond said hopper-leveller assembly affixed to said support element so that when said support element is carried by the barrel of said mold, said axial and peripheral edges of said hopper are adjacent the axis and periphery of the cavity of said mold and said discharge end of said hopper communicates therewith and said blade of said hopper-leveller assembly extends into the mold cavity of said mold in spaced relationship to the bottom thereof and runs between the axis and the periphery of said mold, and means for driving said support element whereby said device rotates and said mold is stationary during the filling and levelling of material in said mold.

2. The device of claim 1 wherein said support element comprises a plurality of arms, one end of each of said arms being joined with the ends of each of said other arms to form a hub, said arms extending radially outwardly in the same plane from said hub so that the angle between each of said arms is the same, each of said arms being provided with a roller having an axis of rotation perpendicular to the axis of said support element, said roller being in spaced relationship from said hub of said support element so that when said support element is positioned on the barrel of said mold assembly, each of said rollers contacts the upper edge thereof to carry the support element thereon and to travel on the upper edge of the barrel of said mold assembly when said support element is driven.

3. The device of claim 2 wherein said hopper-leveller assembly is vertically movably mounted on one arm of said support assembly whereby the spaced relationship between said hopper-leveller and the bottom of said mold assembly is adjustable.

4. The device of claim 2 wherein each of said arms of said support are provided with a roller whose axis of rotation is parallel to the axis of said support element, each roller positioned on each of said arms so that when said support element is carried by said upper edge of the barrel of said mold, said rollers contact the inner surface of the barrel of said mold, thereby to prevent the lateral displacement of said support element as it rotates.

5. The device of claim 1 wherein said support element comprises three arms extending from said hub at an angle of 120° from each other, each of said arms having a length substantially equal to the radius of the cavity of said mold, each of said arms terminating at its outer end with a roller whose axis of rotation is perpendicular to the axis of said support element, an extension carried on the outer end of each of said arms extending beyond said rollers so as to allow free movement thereof and a ring carried by said extensions for contacting said driving means.

6. The device of claim 1 wherein said support element comprises a plurality of radially extending arms having free ends, respectively, and roller means carried by said free ends for rolling engagement with said barrel of said mold assembly.

7. The device of claim 1 together with means for adjusting said hopper-leveller assembly and said blade toward and away from the bottom of said mold.

8. The device of claim 1 including means mounting said blade at a slight angle relative to the plane of the bottom of said mold and extending radially outwardly in a diverging relation therefrom.

References Cited

UNITED STATES PATENTS 2,240,971    5/1941    Wellman.

J. SPENCER OVERHOLSER, Primary Examiner

MICHAEL O. SUTTON, Assistant Examiner

U.S. Cl. X.R.

141—284